US005428743A

United States Patent [19]

Takai

[11] Patent Number: 5,428,743

[45] Date of Patent: Jun. 27, 1995

[54] ARRANGEMENT AND METHOD OF ACCESSING FRAME BUFFER IN RASTER-SCAN TYPE COMPUTER SYSTEM

[75] Inventor: Kazuhito Takai, Tokyo, Japan

[73] Assignee: NEC Corporation, Tokyo, Japan

[21] Appl. No.: 859,008

[22] Filed: Mar. 30, 1992

[30] Foreign Application Priority Data

Mar. 29, 1991 [JP] Japan .................................. 3-089301

[51] Int. Cl.[6] .............................................. G06F 15/62

[52] U.S. Cl. .................................... 395/164; 395/131; 345/114; 345/201

[58] Field of Search ............... 395/131, 162, 164, 425; 340/701, 703, 723, 798–800; 345/204, 214, 98, 112–114, 133, 141, 150, 201, 186, 187

[56] References Cited

U.S. PATENT DOCUMENTS

| | | | |
|---|---|---|---|
| 4,016,544 | 4/1977 | Morita et al. | 395/164 |
| 4,520,358 | 5/1985 | Makino | 340/799 |
| 4,789,963 | 12/1988 | Takahashi et al. | 364/900 |
| 4,825,381 | 4/1989 | Bottorf et al. | 345/114 |
| 4,908,779 | 3/1990 | Iwata | 395/131 |

*Primary Examiner*—Mark R. Powell
*Assistant Examiner*—Kee M. Tung
*Attorney, Agent, or Firm*—Foley & Lardner

[57] ABSTRACT

A multiple-plane frame buffer is effectively accessed which is provided in a video signal generator in a raster-scan type computer system. The video signal generator further includes a video controller preceded by the multiple-plane frame buffer. The video controller receives multiple-bit-per-pixel data from the multiple-plane frame buffer and applies three primary analog data to a raster-scan display. There is provided a pixel data writing controller which is arranged to store a first multiple-bit-per-pixel data defining each color of image pixels and a second multiple-bit-per-pixel data defining each color of background pixels. The pixel data writing controller selectively applies one of the first and second multiple-bit-per-pixel data to the multiple-plane frame buffer in response to a control signal applied thereto.

10 Claims, 5 Drawing Sheets

IMAGE
PIXEL DATA
(WHITE)

BACKGROUND
PIXEL DATA
(RED)

ARRANGEMENT AND METHOD OF ACCESSING FRAME BUFFER IN RASTER-SCAN TYPE COMPUTER SYSTEM

BACKGROUND OF THE INVENTION

1. Field of the Invention

The present invention relates to an arrangement and method of accessing a multiple-plane (viz., multiple-bit) frame buffer in a computer system using a raster-scan type display, and more specifically to such an arrangement and method which is capable of effectively reducing the number of accesses to the frame buffer.

2. Description of the Prior Art

Computer graphics has a rapidly growing importance in the computer field. It is known in the art that there are two types of displays for use in computer graphics: one is a video display (viz., raster-scan type display) while the other is a matrix-addressed storage device such as a plasma plane.

The instant invention is concerned with improvements in a video signal generator which is arranged to supply a raster-scan type display (viz., CRT display) with three analog signals each indicating the intensity of one of the three primaries (red, green and blue).

Before turning to the present invention it is deemed advantageous to briefly discuss prior art with reference to FIGS. 1 and 2.

FIG. 1 is a schematic illustration of a known video signal generator 10 which is operatively provided between a CRT display 14 and a frame buffer controller 12 coupled to a computer system bus. The video signal generator 10 includes a video controller 16 and a multiple-plane frame buffer 18.

The video controller 16 is comprised of a color look-up table 20, a pixel register 22, digital-to-analog (D/A) converters **24*a*–24*c*, and a display scan sync signal generator 26 which produces horizontal and vertical sync signals. The multiple-plane (viz., multiple-bit) frame buffer 18** takes the form of a 4-bit-per-pixel frame buffer in this particular case and accordingly includes four memory planes depicted by I (Intensity per pixel), R (Red), G (Green) and B (Blue).

The binary data stored in the frame buffer 18 are utilized as addresses to a table of colors which are prestored in the look-up table 20 and which are defined by red, green and blue components. Consequently, the 4-bit-per-pixel frame buffer 18 is able to index 16 colors from 4096 colors (for example) previously stored in the look-up table 20. The bit stream from the color look-up table 20 is applied to the pixel register 22 whose contents (12-bit for example) are applied to the CRT display 14 after being converted into corresponding analog signals (denoted by R′, G′ and B′) by the D/A converters **24*a*–24*c***.

The above mentioned video signal generator 10 is well known to those skilled in the art and hence further description thereof would be redundant and therefore omitted for the sake of brevity. It goes without saying that the frame buffer 18 is not limited to the above mentioned 4-bit-per-pixel type.

A known technique for accessing the frame buffer 18 will be discussed with reference to FIG. 2 which is a sketch given for a better understanding of the drawback encountered with the prior art.

FIG. 2(*a*) illustrates an 8×8 bit matrix wherein a character "A" is indicated in a white color on a red color background. The frame buffer controller 12 accesses the frame buffer 18 for writing thereto pixel data representative of the character "A".

According to the prior art, the frame buffer controller 12 is required to access the frame buffer 18 twice in this particular case: the first access is for writing the image (viz., character) color (white) pixel data as shown in FIG. 2(*b*) while the second is for writing the background color (red) pixel data as shown in FIG. 2(*c*). Especially, in the case where the background is unicolored over an entire display frame, it is time consuming to access the frame buffer for writing the background pixel data thereto.

SUMMARY OF THE INVENTION

It is an object of the present invention to provide an arrangement which requires only one access to the frame buffer in the event that each of the background and the image to be displayed is unicolored.

Another object of the present invention is to provide a method which requires only one access to the frame buffer in the event that each of the foreground and foreground of a display frame is unicolored.

More specifically, a first aspect of the present invention comes in an arrangement for accessing a multiple-plane frame buffer under the control of a frame buffer controller provided in a video signal generator in a raster-scan type computer system, the video signal generator further including a video controller preceded by the multiple-plane frame buffer, the video controller receiving multiple-bit-per-pixel data from the multiple-plane frame buffer and applying three primary analog data to a raster-scan display, the arrangement comprising: means for storing a first multiple-bit-per-pixel data defining each color in the image pixels and a second multiple-bit-per-pixel data defining each color in the background pixels, the means selectively applying one of the first and second multiple-bit-per-pixel data to the multiple-plane frame buffer in response to a control signal applied from the buffer controller.

A second aspect of the present invention comes in an arrangement for accessing a multiple-plane frame buffer provided in a video signal generator in a raster-scan type computer system, the video signal generator further including a video controller preceded by the multiple-plane frame buffer, the video controller receiving multiple-bit-per-pixel data from the multiple-plane frame buffer and applying three primary analog data to a raster-scan display, the arrangement comprising: first memory means coupled to receive a first multiple-bit-per-pixel data defining each color of image pixels; second memory means coupled to receive a second multiple-bit-per-pixel data defining each color of background pixels; and a plurality of selectors each being operatively, selectively coupled to relay one of the contents of the first and second memory means to the multiple-plane frame buffer in response to a control signal applied thereto.

A third aspect of the present invention comes in a method of accessing a multiple-plane frame buffer provided in a video signal generator in a raster-scan type computer system, the video signal generator further including a video controller preceded by the multiple-plane frame buffer, the video controller receiving multiple-bit-per-pixel data from the multiple-plane frame buffer and applying three primary analog data to a raster-scan display, the method comprising the steps of: (a) storing a first multiple-bit-per-pixel data defining each color of image pixels; (b) storing a second multiple-bit-per-pixel data defining each color of background pixels; and (c) selecting one of the contents of the first and second memory means and relaying the selected content to the multiple-plane frame buffer in response to a control signal applied thereto.

BRIEF DESCRIPTION OF THE DRAWINGS

The features and advantages of the present invention will be clearly appreciated from the following description taken in conjunction with the accompanying drawings in which like elements are denoted by like reference numerals and in which.

DETAILED DESCRIPTION OF THE PREFERRED EMBODIMENTS

A first embodiment of the present invention will be discussed with reference to FIGS. 3–6.

Figure 1:
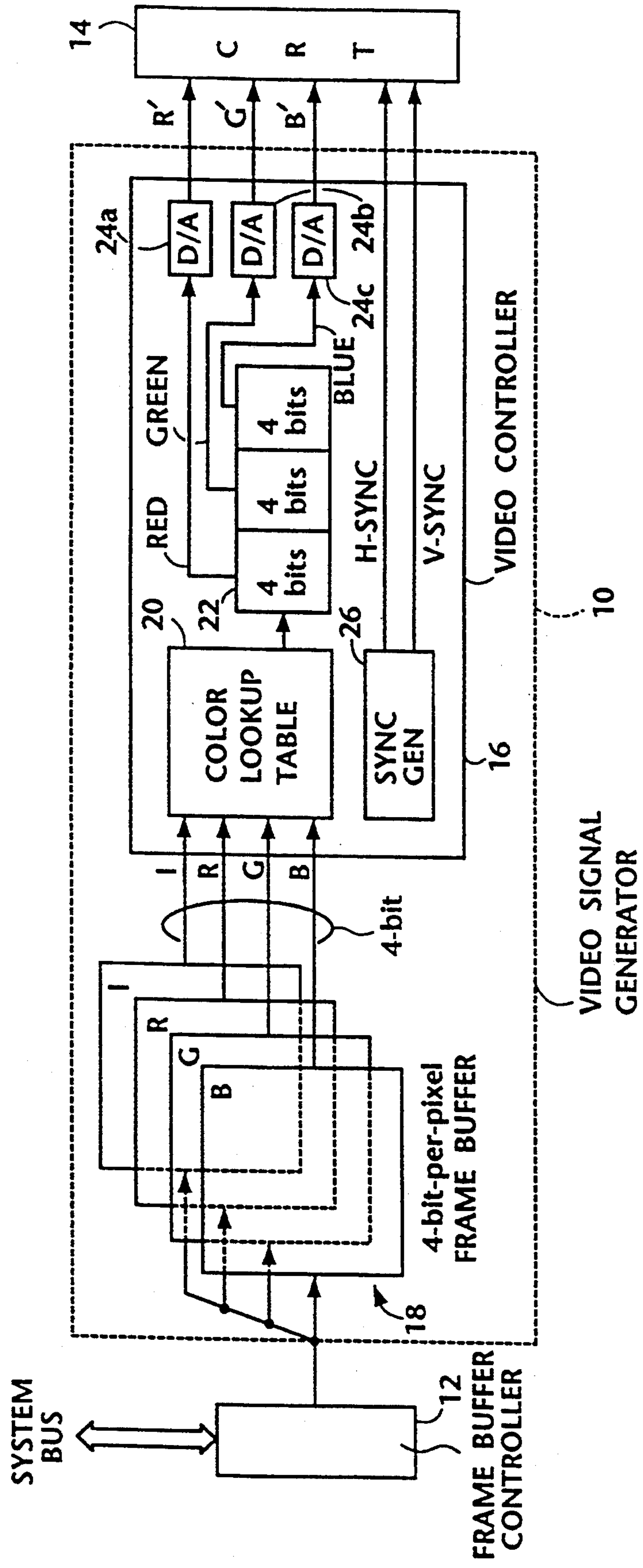
FIG. 1 (PRIOR ART)
FIG. 1 is a block diagram showing the prior art arrangement discussed in the opening paragraphs of instant disclosure.
Figure 2A:
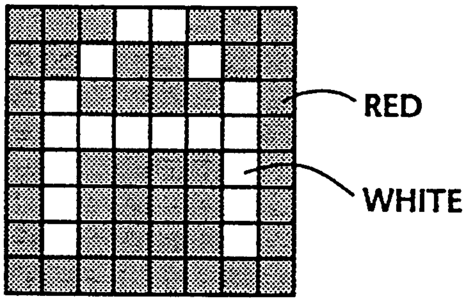
FIG. 2(a) (PRIOR ART)
FIGS. 2(*a*), 2(*b*), 2(*c*) are sketches illustrating the processes which induce the requirement for multiple accessing inherent in the prior art.
Figure 2B:
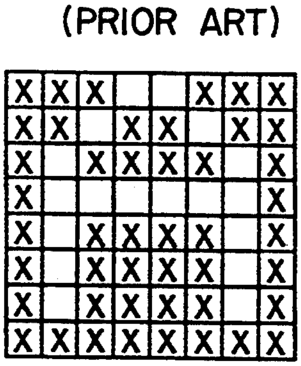
FIG. 2(b) (PRIOR ART)
Figure 2C:
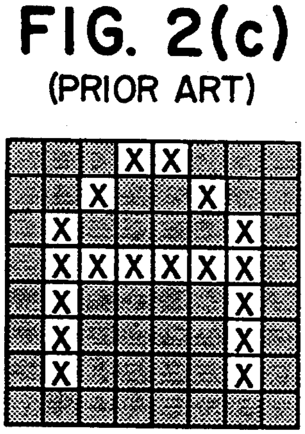
FIG. 2(c) (PRIOR ART)
Figure 3:
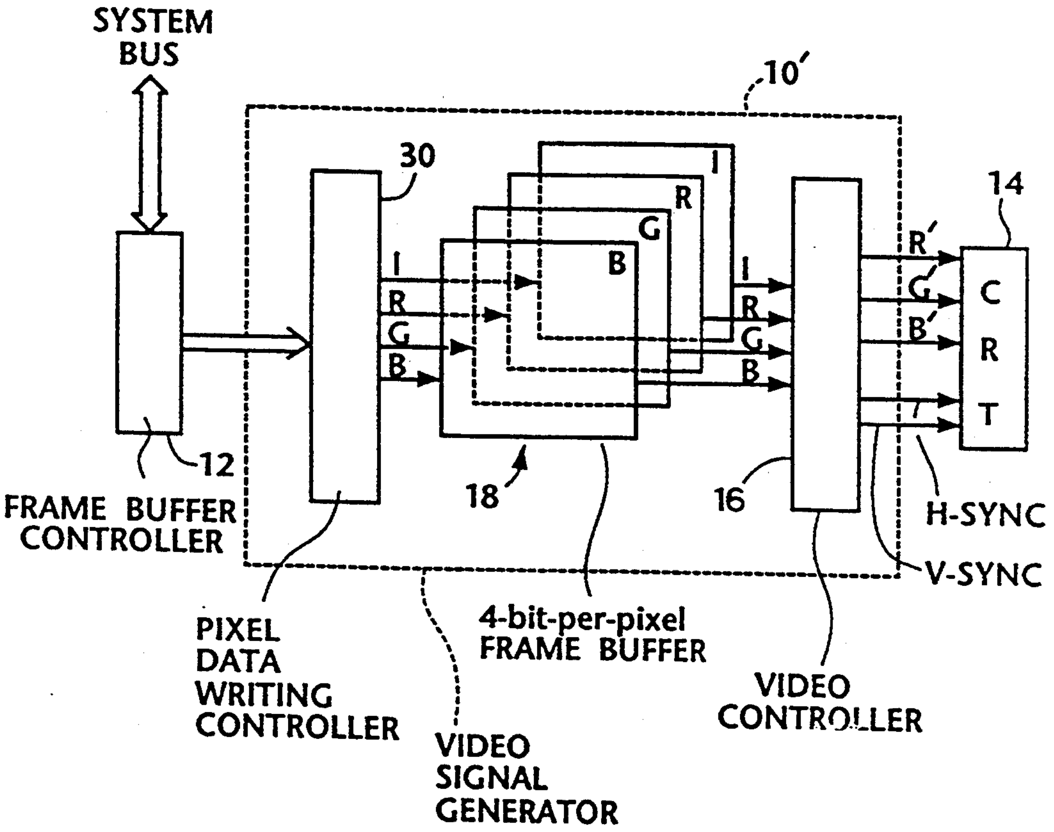
FIG. 3 is a block diagram showing a first embodiment of the present invention.

FIG. 3 shows an overall arrangement 10′ of the first embodiment wherein a pixel data writing controller 30 is additionally included in the type of arrangement depicted in FIG. 1 The remainder of FIG. 3 is essentially similar to the arrangement of FIG. 1 and like elements are labelled with the same reference numerals. Further description thereof will be omitted for brevity. The controller 30 is provided between the frame buffer controller 12 and the frame buffer 18.

Figure 4:
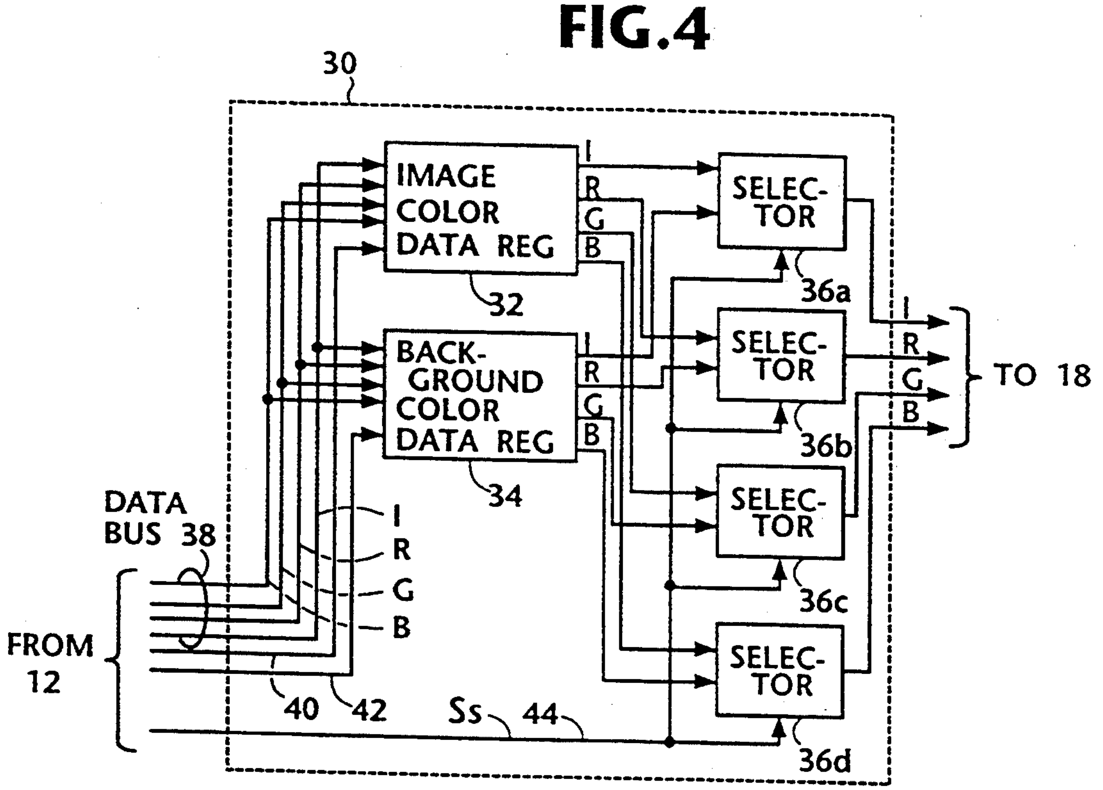
FIG. 4 is a block diagram showing details of the pixel data writing controller shown in FIG. 3.

FIG. 4 shows the arrangement of the pixel data writing controller 30 according to the first embodiment. The arrangement shown in this figure includes an image color data register 32, a background color data register 34, and four selectors **36*a*–36*d*. Each of the data registers 32, 34 is supplied with 4-bit pixel data through a data bus 38 prior to the writing operations of pixel data to the frame buffer 18 (FIG. 3**).

The register 32 is allowed to receive the image color data when an enable signal is applied thereto over a line 40. Similarly, the register 34 is allowed to receive the background color data when an enable signal is applied thereto over a line 42. As mentioned above, in the event that the image color is bright white and the background color is bright red, then the register 32 receives four bit data (I=1, R=1, G=1 and B=1) while the register 34 receives four bit data (I=1, R=1, G=0 and B=0) by way of example.

Each of the selectors **36*a*–36*d* is supplied with a selection control signal Ss from the display controller 12 over a line 44. The signal Ss takes one of two states "1" and "0". In the event that an image pixel data should be applied to the frame buffer 18, the signal Ss assumes logic "1" (for example). On the other hand, if a background pixel data should be applied to the frame buffer 18, the signal Ss assumes logic "0". Each of the selectors 36*a*–36*d*, in response to the control signal Ss, selects one of the data registers 32, 34**.

As will be understood, this renders it unnecessary for the frame buffer controller 12 to access the frame buffer 18 two times for writing the image and background pixel data as in the case of the prior art.

Figure 5:
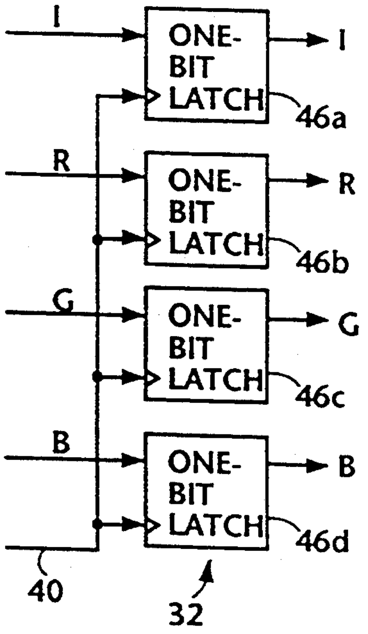
FIGS. 5 and 6 are diagrams which show details of the pixel data writing controller shown in FIG. 4.

FIG. 5 illustrates an arrangement of the image color data register 32 which includes four latches **46*a*–46*d* in this instance. The FIG. 5 arrangement itself is straightforward and hence it is deemed unnecessary to discuss the operations thereof. The other data register 34 is configured exactly the same as the counterpart 32**.

Figure 6:
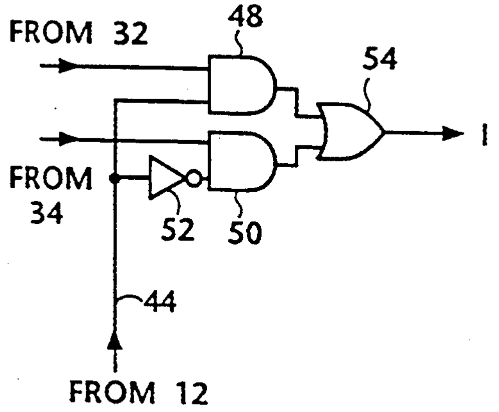

FIG. 6 is a circuit diagram showing an arrangement of the selector **36*a* which includes two AND gates, an inverter 52 and an OR gate 54. Each of the other selectors 36*b*–36*d* is configured in the same manner as selector 36*a*. The FIG. 6** arrangement is also quite simple and hence it is deemed unnecessary to discuss the operations thereof.

A second embodiment of the present invention will be discussed with reference to FIG. 7.

Figure 7:
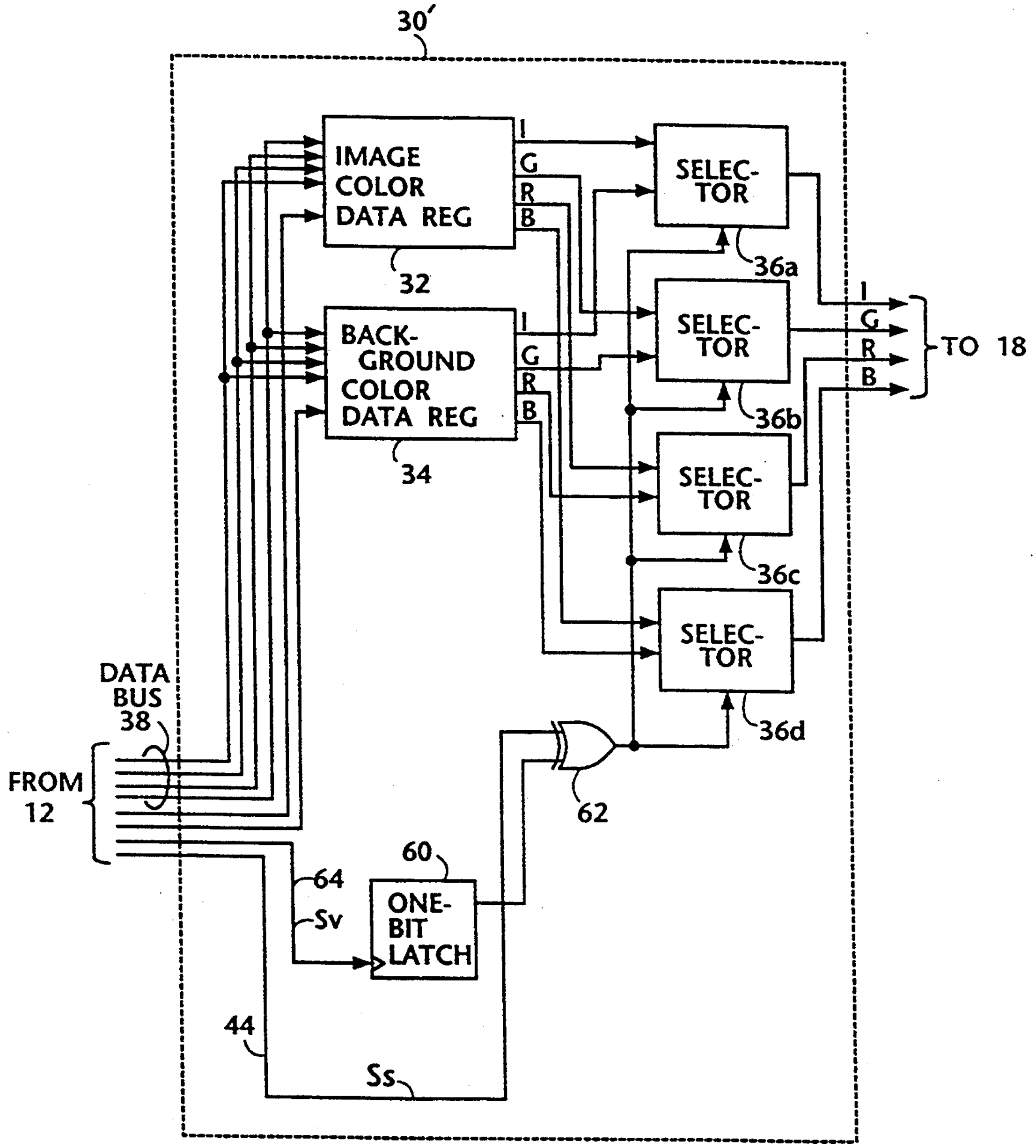
FIG. 7 is a block diagram showing a second embodiment of the present invention.

The FIG. 7 arrangement, denoted by numeral 30′, further includes a one-bit latch 60 and an exclusive-OR gate 62 in addition to the first embodiment depicted in FIG. 3. The remainder of FIG. 7 is essentially to the arrangement of FIG. 3 and like elements are labelled with the same reference numerals. In the event that the one-bit latch 60 is supplied with a control signal Sv assuming a logic "0" from the frame buffer controller 12 over a line 64, the operation of the second embodiment is identical to that of the first embodiment. However, if the one-bit latch stores a logic "1" then the selection of the data registers 32, 34 by the selectors **36*a*–36*d* is reversed. More specifically, in the event the control signal Ss assumes a logic "1", each of the selectors 36*a*–36*d* selects the data register 34, while if Ss assumes a logic "0" then each of the selectors 36*a*–36*d* selects the data register 32**.

It will be understood that the above disclosure is representative of only two possible embodiments of the present invention and that the concept on which the invention is based is not specifically limited thereto.

What is claimed is:

1. An arrangement for accessing a multiple-plane frame buffer, which is controlled by a frame buffer controller, provided in a video signal generator in a raster-scan type computer system, said video signal generator further including a video controller connected to said multiple-plane frame buffer, said video controller receiving multiple-bit-per-pixel data from said multiple-plane frame buffer and applying three primary analog data to a raster-scan display, said arrangement comprising:

first means operatively coupled between said frame buffer controller and said frame buffer for storing first multiple-bit-per-pixel data applied from said frame buffer controller, said first multiple-bit-per-pixel data defining each color of image pixels;

second means operatively coupled between said frame buffer controller and said frame buffer for storing second multiple-bit-per-pixel data applied from said frame buffer controller, said second multiple-bit-per-pixel data defining each color of background pixels; and third means selectively applying one of said first and second multiple-bit-per-pixel data to said multiple-plane frame buffer in response to a control signal applied from said frame buffer controller, and wherein said first means stores said first multiple-bit-per-pixel data received from said frame buffer controller corresponding to a particular pixel at a same time said second means stores said second multiple-bit-per-pixel data received from said frame buffer controller corresponding to said particular pixel.

2. An arrangement as claimed in claim 1, wherein said first means includes:

first memory means coupled to receive said first multiple-bit-per-pixel data from said frame buffer controller;

second memory means coupled to receive said second multiple-bit-per-pixel data from said frame buffer controller; and a plurality of selectors, each being operatively selectively coupled to relay one of the contents of said first and second memory means to said multiple-plane frame buffer in response to said control signal.

3. An arrangement as claimed in claim 2, wherein each of said first and second memory means includes a plurality of one bit latches.

4. An arrangement for accessing a multiple-plane frame buffer, which is controlled by a frame buffer controller, provided in a video signal generator in a raster-scan type computer system, said video signal generator further including a video controller connected to said multiple-plane frame buffer, said video controller receiving multiple-bit-per-pixel data from said multiple-plane frame buffer and applying three primary analog data to a raster-scan display, said arrangement comprising:

first memory means connected between said frame buffer controller and said multiple-plane frame buffer and coupled to receive, from said frame buffer controller, first multiple-bit-per-pixel data defining each color of image pixels;

second memory means connected between said frame buffer controller and said multiple-plane frame buffer and coupled to receive, from said frame buffer controller, second multiple-bit-per-pixel data defining each color of background pixels; and a plurality of selectors, each operatively and selectively coupled to relay one of the contents of said first and second memory means to said multiple-plane frame buffer in response to a control signal applied from said frame buffer controller, and wherein said first multiple-bit-per-pixel data received from said frame buffer controller corresponding to a particular pixel is stored in said first memory means at a same time said second multiple-bit-per-pixel data received from said frame buffer controller corresponding to said particular pixel is stored in said second memory means.

5. An arrangement as claimed in claim 4, wherein each of said first and second memory means includes a plurality of one bit latches.

6. A method of accessing a multiple-plane frame buffer, which is controlled by a frame buffer controller, provided in a video signal generator in a raster-scan type computer system, said video signal generator further including a video controller connected to said multiple-plane frame buffer, said video controller receiving multiple-bit-per-pixel data from said multiple-plane frame buffer and applying three primary analog data to a raster-scan display, said method comprising the steps of:

(a) storing a first multiple-bit-per-pixel data defining each color of image pixels in a first memory, said first multiple-bit-per-pixel data applied from said frame buffer controller;

(b) storing a second multiple-bit-per-pixel data defining each color of background pixels in a second memory, said second multiple-bit-per-pixel data being applied from said frame buffer controller, wherein said storing in the step (b) is performed at a same time as said storing in the step (a); and (c) selecting one of the contents of said first and second memory in response to a control signal generated from said frame buffer controller and relaying the selected contents to said multiple-plane frame buffer.

7. An arrangement for accessing a multiple-plane frame buffer, which is controlled by a frame buffer controller, provided in a video signal generator in a raster-scan type computer system, said video signal generator further including a video controller connected to said multiple-plane frame buffer, said video controller receiving multiple-bit-per-pixel data from said multiple-plane frame buffer and applying three primary analog data to a raster-scan display, said arrangement comprising:

first memory means connected between said frame buffer controller and said multiple-plane frame buffer and coupled to receive, from said frame buffer controller, first multiple-bit-per-pixel data defining each color of image pixels;

second memory means connected between said frame buffer controller and said multiple-plane frame buffer and coupled to receive, from said frame buffer controller, second multiple-bit-per-pixel data defining each color of background pixels;

a logic circuit coupled to receive first and second control bits from said frame buffer controller, said logic circuit generating a third control bit for selecting one of said first and second memory means; and a plurality of selectors each being operatively and selectively coupled to relay one of the outputs of said first and second memory means to said multiple-plane frame buffer in response to said third control bit.

8. An arrangement as claimed in claim 7, wherein said logic circuit comprises:

a one-bit latch coupled to receive said first control bit from said frame buffer controller; and a logic gate having a first input for receiving said first control bit latched in said one-bit latch and having a second input for receiving a second control bit from said third control bit depending on said first and second control bits.

9. An arrangement for accessing a multiple-plane frame buffer, under control of a frame buffer controller, provided in a video signal generator in a raster-scan type computer system, said video signal generator further including a video controller connected to said multiple-plane frame buffer, said video controller receiving multiple-bit-per-pixel data from said multiple-plane frame buffer and applying three primary analog data to a raster-scan display, said arrangement comprising:

first memory means connected between said frame buffer controller and said multiple-plane frame buffer and coupled to receive, from said frame buffer controller, first multiple-bit-per-pixel data defining each color of image pixels;

second memory means connected between said frame buffer controller and said multiple-plane frame buffer and coupled to receive, from said frame buffer controller, second multiple-bit-per-pixel data defining each color of background pixels;

a one-bit latch coupled to receive a first control bit from said frame buffer controller;

a logic gate having a first input for receiving said first control bit latched in said one-bit latch and having a second input for receiving a second control bit from said frame buffer controller, said logic gate generating a third control bit depending on said first and second control bits; and a plurality of selectors, each being operatively and selectively coupled to relay one of the outputs of said first and second memory means to said multiple-plane frame buffer in response to said third control bit.

10. A method of accessing a multiple-plane frame buffer, which is controlled by a frame buffer controller, provided in a video signal generator in a raster-scan type computer system, said video signal generator further including a video controller connected to said multiple-plane frame buffer, said video controller receiving multiple-bit-per-pixel data from said multiple-plane frame buffer and applying three primary analog data to a raster-scan display, said method comprising the steps of:

(a) storing a first multiple-bit-per-pixel data defining each color of image pixels in a first memory, said first multiple-bit-per-pixel data being applied from said frame buffer controller;

(b) storing a second multiple-bit-per-pixel data defining each color of background pixels in a second memory, said second multiple-bit-per-pixel data being applied from said frame buffer controller;

(c) generating a control signal based on first and second control bits generated from said frame buffer controller, said first and second control bits indicating in combination selection of one of said first and second memory;

(d) selecting one of the contents of said first and second memory in response to said control signal; and (e) relaying the selected contents to said multiple-plane frame buffer.

* * * * *